Dec. 12, 1950  T. L. E. HAUG  2,533,370
PIPE SUPPORT
Filed March 29, 1948

WITNESSES:
JW Trahan
G.J. Kuntz

INVENTOR:
Thaddeus L.E. Haug

Patented Dec. 12, 1950

2,533,370

UNITED STATES PATENT OFFICE 2,533,370

PIPE SUPPORT

Thaddeus L. E. Haug, Berkeley, Calif.

Application March 29, 1948, Serial No. 17,770

5 Claims. (Cl. 248—73)

The invention relates to exposed supports for large and relatively thin walled pipe used for the conveyance of water or other fluids under pressure.

In the recent past, such pipe has often been supported by the use of ring girders surrounding the pipe at points of support and made integral with the pipe to prevent it from being distorted out of true circularity by the supporting columns.

However, such ring girders are very expensive to apply and to locate with precision at the proper points on the pipe.

Furthermore, when the pipe is placed under pressure, the ring girders tend to confine it against its natural circumferential stretch, and thereby produce undesirable radial or "rim" bending stresses in the pipe shell adjacent to the ring, which stresses coincide in direction with the flexural stresses needed to carry the pipe between supports.

The purpose of this invention is to provide, for large thin wall pipe, a type of support which does not require expensive preparation of the pipe and does not restrict its circumferential stretch due to the application of internal pressure which permits heavy loading on the support without producing dangerous distortions of the pipe shell, and which permits longitudinal expansion or contraction of the pipe due to temperature changes without producing excessive thrusts on the support in line with the pipe.

The invention has certain other advantages and features, some of which, with the foregoing, will be set forth in detail in the following description, where I shall outline that form of the invention which I have selected for illustration in the drawings accompanying and forming a part of the present specification.

In said drawings I have shown one form of the construction of my invention, but it is to be understood that I do not limit myself to such form, since the invention as expressed in the claims may be embodied in a plurality of forms.

In the accompanying drawings, which have been distorted in scale in order to clarify the features about to be described:

Figure 1 shows one half of a transverse cross-section of the pipe taken on plane 1—1 as indicated in Figure 3, together with a transverse elevation of one side of the pipe support.

Figure 2 shows one half of a transverse cross-section of the pipe taken on plane 2—2 as indicated in Figure 3, together with a transverse cross-section of the other side of the pipe support, omitting studs 19 and nuts 20 to promote clarity of description.

Figures 1, 2, 3:
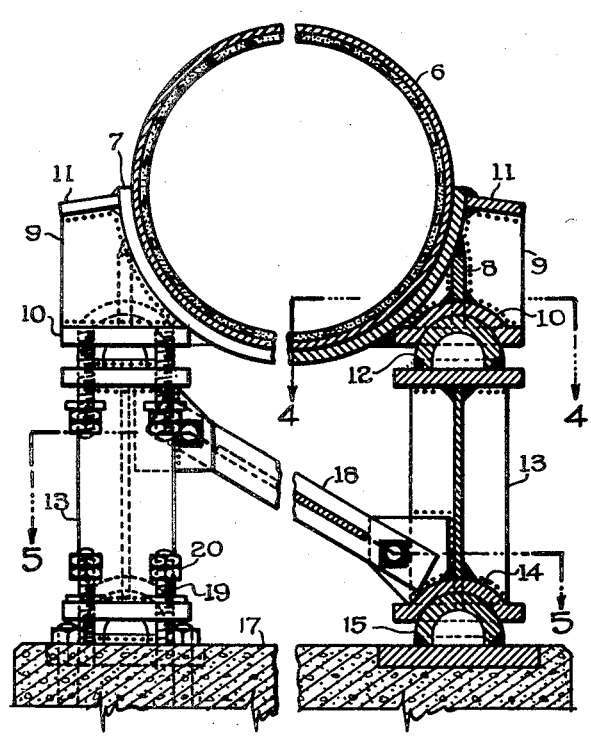
Figure 3 is a side elevation of the pipe support with an adjacent portion of the pipe.
Figures 4, 5:
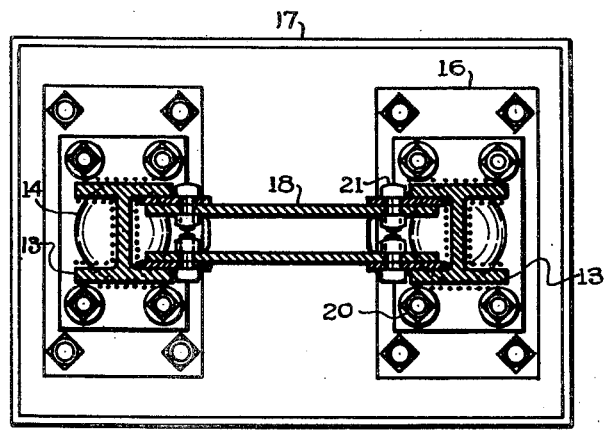
Figure 4 is a cross-section of part of the support, taken on plane 4—4 as indicated in Figure 2.
Figure 5 is a transverse cross section of the pipe support taken on planes 5—5 as indicated in Figures 1 and 2.

In the drawings, 6 is the pipe shown resting upon its support comprising a relatively thin strap 7 directly bearing on the pipe surface and supported by webs 8 braced back to strap 7 by bracing flanges 9. It is assumed that the support will be generally of arc welded construction, and welds are indicated in the drawings by rows of dots adjacent to the welded junction.

10 is an upper socket member attached to 7, 8 and 9, and 11 is a coping flange attached to the tops of strap 7 and flanges 9.

On the bottom of upper socket member 10 is a segment of a concave spherical surface bearing upon the top of a corresponding convex spherical surface on the top of the half-ball 12.

Half-ball 12 may be attached to a base plate which slides or rolls upon a fixed surface as the pipe expands or contracts in length under temperature variations, but in the particular construction shown in the drawings 12 is attached to the top of a column 13. to the bottom of which is attached a lower socket member 14 similar to 10 and bearing upon a half ball 15 similar to 12.

Half ball 15 is attached to a base plate 16 bolted to a foundation block 17 of reinforced concrete or other suitable material.

18 is a single diagonal brace connecting the upper part of post 13 on one side of the pipe to the lower end of post 13 on the other side of the pipe. 18 is a member capable of taking tension, compression and flexure, and of resisting lateral forces such as wind or earthquake loads on the pipe. At the same time it prevents torsional movement of either post or column 13, such as might otherwise result from a non-uniform distribution of ball and socket friction when a temperature change causes longitudinal movement of the pipe. If the friction on the inner side of a ball (toward the pipe) is not exactly equal to that on the outer side of the same ball, the difference in friction will tend to rotate the ball in a plane parallel to the direction of the pipe line, and so rotate the column 13 to which the ball is attached.

Brace 18 is attached to columns 13 by means of bolts 21, which permit a slight angular movement of columns 13 transverse to the pipe line, said angular movement being necessary to accommodate the slight changes in the pipe cross-section as it fills with water or is placed under pressure.

To erect and adjust the support and to limit the amplitude of movement of colums 13, studs 19 extend across each ball and socket bearing and are provided with nuts 20. Each stud 19 is threaded into one member of the ball and socket joint, such as 16, and passes through a large clearance hole in the opposite member, such as 14, and nuts 20 may be set down upon the latter member to temporarily prevent movement in the joint while the pipe is being installed.

After the pipe has been installed on the support, and connected to other lengths of pipe extending through to a fixed anchor, nuts 20 are backed off and adjusted to allow for such amplitude of movement between ball and socket surfaces as is needed to accommodate the expansion and contraction of the pipe due to temperature changes, without permitting excessive movement in case of pipe failure.

As the pipe expands or contracts longitudinally, strap 7 moves with it, because the static friction between strap 7 and the pipe is greatly in excess of the force needed to cause relative angular movement of the contacting ball and socket surfaces interposed between strap 7 and foundation block 17.

It will be noted that the pipe 6 with upper assembly 7—8—9—10—11, columns 13, base block 17 and brace 18 form a braced support which is unique in that the top member, viz. pipe 6 with the strap assembly 7—8—9—10—11 is of a variable length between the tops of columns 13. The transverse distance between the tops of columns 13 varies slightly with the stage of filling of the pipe and with the pressure applied to the interior of the pipe, due to the elastic behaviour of the pipe shell under different loading conditions, and the flexibility of strap 7 permits it to adjust itself to these different loading conditions without setting up any heavy bending moments in the pipe support.

Also, the distance between the tops of columns 13 may vary the necessary slight amount without materially affecting the direct stress in diagonal brace 18.

The assembly described adapts itself well to inaccuracies of workmanship, since the two colums 13 do not have to be exactly parallel either transversely or longitudinally with respect to the pipe. Thus no part of the support requires any machined surfaces other than drilled or tapped holes.

The half ball 12 or 15 is ordinarily made of a harder type of material than socket 10 or 14, so that the rubbing of the half ball on the socket, as the pipe moves, will not cause an abrasive or tearing action on the rubber surfaces but will permit the harder material of the half ball to press down any irregularities in the softer rubbing surface of the socket, so that the surfaces of both members will tend to remain smooth.

One of the important advantages of the pipe support above described is due to the fact that large thin walled pipe, as usually manufactured, is seldom perfectly circular, but may depart from the true circularity as much as one percent. A high internal pressure applied to such pipe tends to force it into a truly circular shape, and the pipe support here shown does not materially interfere with such change of shape, nor develop substantial stresses in itself as a result of such change.

The above is an important element of superiority to the stiffening ring girder type of support, where the ring is attached to the pipe before working pressures are applied to the latter, and departure of the pipe from true circularity may therefore cause substantial unforeseen stresses in both pipe and stiffening ring when normal working pressures are applied to the pipe and tend to bring it back to true circularity.

I claim:

1. A pipe support, comprising a curved strap adjacent to the pipe shell and bearing radially upon it, and ball-and-socket joints affixed to the strap in such a position that a straight line, radial to the socket bearing surface at the mid point thereof, will be approximately tangential to the curve of the pipe shell and strap.

2. A pipe support, comprising a curved strap adjacent to the pipe shell and bearing radially upon it, ball-and-socket joints fastened to the strap in such a position that a straight line, radial to the socket bearing surface at the mid point thereof, is approximately tangential to the curve of pipe shell and strap; and bolts across the ball-and-socket joints, whereby said joints may be temporarily immobilized so as to hold the strap in a stationary position while the pipe is being installed upon it.

3. A pipe support, comprising a frame with two posts, a single diagonal brace between them, and a relatively thin strap cross member connecting the tops of the two posts and curved to support the pipe by direct radial pressure on the pipe shell, each post being articulated to the strap at a position fixed thereon and each post being so positioned that its longitudinal axis coincides with a straight line which is approximately tangential to the curve of the strap member adjacent to the pipe shell.

4. A pipe support, comprising a frame with two posts, a single diagonal brace between the posts, a relatively thin strap cross member articulated to the tops of the two posts and curved to support the pipe by direct radial pressure on the pipe shell, each post being so positioned that its longitudinal axis coincides with a straight line which is approximately tangential to the curve of the strap member adjacent to the pipe shell, and each articulation consisting of a ball-and-socket joint fastened to the strap at a fixed location thereon.

5. A pipe support, comprising a frame with two posts, a single diagonal brace between the posts, a relatively thin strap cross member articulated to the tops of the two posts by ball-and-socket joints fastened to the strap at fixed locations thereon, said strap being curved to support the pipe by direct radial pressure on the pipe shell, each post being so positioned that its longitudinal axis coincides with a straight line which is approximately tangential to the curve of the strap member adjacent to the pipe shell, ball-and-socket joints at the bottoms of the posts, and bolts across the ball-and-socket joints, whereby said joints may be temporarily immobilized while the pipe is being installed upon the support.

THADDEUS L. E. HAUG.

REFERENCES CITED

The following references are of record in the file of this patent:

UNITED STATES PATENTS

| Number | Name | Date |
| --- | --- | --- |
| 362,115 | Rosenblatt | May 3, 1887 |
| 1,097,273 | Tyler | May 19, 1914 |
| 1,516,838 | Arnold et al. | Nov. 25, 1924 |
| 1,911,485 | Axlund | May 30, 1933 |

FOREIGN PATENTS

| Number | Country | Date |
| --- | --- | --- |
| 4,760 | Norway | Mar. 10, 1930 |